US009554183B2

(12) United States Patent
Dong et al.

(10) Patent No.: US 9,554,183 B2
(45) Date of Patent: Jan. 24, 2017

(54) CACHING OF CAPABILITIES INFORMATION OF COUNTERPART DEVICE FOR EFFICIENT HANDSHAKING OPERATION

(71) Applicant: Lattice Semiconductor Corporation, Portland, OR (US)

(72) Inventors: Feng Dong, Shanghai (CN); Fei Shen, Shanghai (CN); Ke Chen, Shanghai (CN); Xiangming Yu, Shanghai (CN); Jin Ding, Shanghai (CN)

(73) Assignee: Lattice Semiconductor Corporation, Portland, OR (US)

( * ) Notice: Subject to any disclaimer, the term of this patent is extended or adjusted under 35 U.S.C. 154(b) by 63 days.

(21) Appl. No.: 14/368,781

(22) PCT Filed: May 8, 2014

(86) PCT No.: PCT/CN2014/077033
§ 371 (c)(1),
(2) Date: Jun. 25, 2014

(87) PCT Pub. No.: WO2015/168903
PCT Pub. Date: Nov. 12, 2015

(65) Prior Publication Data
US 2016/0037212 A1    Feb. 4, 2016

(51) Int. Cl.
*G06F 3/00* (2006.01)
*H04N 21/4402* (2011.01)
(Continued)

(52) U.S. Cl.
CPC ........ *H04N 21/440218* (2013.01); *H04N 5/38* (2013.01); *H04N 5/44* (2013.01);
(Continued)

(58) Field of Classification Search
CPC ................. H04N 21/440218; H04N 21/43635; H04N 7/01; H04N 21/43637; H04N 5/38; H04N 5/44; H04N 21/4402; H04N 21/4108; H04N 21/4331; H04N 21/4621
See application file for complete search history.

(56) References Cited

U.S. PATENT DOCUMENTS

| 7,716,385 B2 * | 5/2010 | Saint-Hilaire .... H04L 29/12009 348/158 |
| 8,677,029 B2 * | 3/2014 | Raveendran .......... H04W 28/18 710/10 |

(Continued)

FOREIGN PATENT DOCUMENTS

| CN | 102131090 A | 7/2011 |
| CN | 103475627 A | 12/2013 |

(Continued)

OTHER PUBLICATIONS

VESA Enhanced Extended Display Identification Data Standard, Release A, Revision 1, E-EDIDTm Standard, Feb. 9, 2000, 32 pages.

(Continued)

*Primary Examiner* — Jing-Yih Shyu
(74) *Attorney, Agent, or Firm* — Fenwick & West LLP (57) ABSTRACT

Embodiments related to storing and utilizing information of a sink device for establishing communication. A source device retrieves the information of a previously connected sink device stored in the source device to reduce data exchanged during a handshaking operation. Information of the sink device not stored in the source device may be stored in the source device for future usage. The source device receives identification information of the sink device via a medium. The source device also searches for capabilities information associated with the identification information in the source device. In addition, the source device encodes the (Continued)

content for transmission to the sink device via the medium in a format compliant with capabilities of the sink device according to the capabilities information.

20 Claims, 5 Drawing Sheets (51) Int. Cl.
| | |
|---|---|
| H04N 5/38 | (2006.01) |
| H04N 5/44 | (2011.01) |
| H04N 7/01 | (2006.01) |
| H04N 21/4363 | (2011.01) |
| H04N 21/41 | (2011.01) |
| H04N 21/433 | (2011.01) |
| H04N 21/462 | (2011.01) |

(52) U.S. Cl.
CPC ........ *H04N 7/01* (2013.01); *H04N 21/4108* (2013.01); *H04N 21/4331* (2013.01); *H04N 21/43635* (2013.01); *H04N 21/43637* (2013.01); *H04N 21/4402* (2013.01); *H04N 21/4621* (2013.01)

(56) References Cited

U.S. PATENT DOCUMENTS

| | | | | |
|---|---|---|---|---|
| 9,185,385 | B2* | 11/2015 | Nakajima | G09G 5/006 |
| 2003/0159043 | A1* | 8/2003 | Epstein | H04L 29/06 |
| | | | | 713/176 |
| 2006/0161538 | A1* | 7/2006 | Kiilerich | G06F 17/30569 |
| 2007/0162753 | A1* | 7/2007 | Nakano | H04L 9/0844 |
| | | | | 713/171 |
| 2007/0274689 | A1* | 11/2007 | Stone | G09G 5/006 |
| | | | | 386/200 |
| 2009/0153734 | A1* | 6/2009 | Glen | G09G 5/006 |
| | | | | 348/552 |
| 2010/0289872 | A1* | 11/2010 | Funabiki | G09G 3/003 |
| | | | | 348/43 |
| 2011/0107388 | A1* | 5/2011 | Lee | H04N 7/17318 |
| | | | | 725/118 |
| 2012/0069894 | A1* | 3/2012 | Sakimura | H04N 7/163 |
| | | | | 375/240.02 |
| 2013/0174208 | A1* | 7/2013 | Lee | H04N 21/4122 |
| | | | | 725/109 |
| 2013/0174238 | A1* | 7/2013 | Wang | H04N 21/25816 |
| | | | | 726/7 |
| 2014/0129738 | A1* | 5/2014 | Hussain | G06F 1/1632 |
| | | | | 710/8 |
| 2014/0281076 | A1* | 9/2014 | Breece, III | G06F 13/42 |
| | | | | 710/106 |
| 2015/0023648 | A1* | 1/2015 | Sheth | H04N 5/775 |
| | | | | 386/230 |
| 2015/0326638 | A1* | 11/2015 | Yarygin | H04L 65/602 |
| | | | | 709/219 |

FOREIGN PATENT DOCUMENTS

| | | |
|---|---|---|
| CN | 103634172 A | 3/2014 |
| WO | WO 2014/039457 A1 | 3/2014 |

OTHER PUBLICATIONS

PCT International Search Report, PCT Application No. PCT/CN2014/077033, Feb. 9, 2015, 11 pages.

* cited by examiner

CACHING OF CAPABILITIES INFORMATION OF COUNTERPART DEVICE FOR EFFICIENT HANDSHAKING OPERATION

BACKGROUND

1. Field of the Disclosure

This disclosure pertains in general to data communications, and more specifically to improved handshaking between two devices.

2. Description of the Related Art

As a source device (e.g., a graphics card, DVD player, handheld device, and gaming console) becomes portable, various sink devices (e.g., a monitor, projector, and TV) can be connected to the source device. To establish a connection between a sink device and a source device, both devices perform a handshaking operation to ensure proper communication. The handshaking operation involves receiving and confirming identification information of a sink device and supported display modes of the sink device. The display modes may indicate, for example, resolution of the display device or timing required for properly displaying images.

SUMMARY

Embodiments of the present disclosure are related to storing and utilizing information of a sink device for establishing a communication link. When a sink device is connected to a source device, a source device retrieves information of a previously connected sink device stored in the source device to reduce data exchanged during a handshaking operation. If the source device does not store information of the sink device, the source device receives information of the sink device from the sink device and stores the information in the source device for future usage.

In one embodiment, the source device receives identification information of the sink device via a medium. Capabilities information associated with the identification information is searched in the source device. Content for transmission to the sink device via the medium is encoded in a format that is compliant with capabilities of the sink device according to the capabilities information.

In one embodiment, the identification information of the sink device is derived from Extended Display Identification Data (EDID) of the sink device. The capabilities information may include one or more of 3D video support data, high-end video support data, audio data tunneling support data, and enhanced MHL Sideband Channel (eMSC) data tunneling support data of the sink device. The capabilities information may be transmitted to the source device aver one or more write burst sequences.

In one embodiment, the method includes retrieving the capabilities information of the sink device stored in the source device when the capabilities information stored in the source device is identified. The source device receives the capabilities information from the sink device when it is determined that the capabilities information is not stored in the source device. The received capabilities information is stored in the source device. A replaceable entry is overwritten with the capabilities information of the sink device after determining that memory space entries in the source device to store capabilities information are full. The capabilities information of the sink device is stored in the replaceable entry after determining the replaceable entry.

In one embodiment, the medium includes a cable compatible for transmitting data using a Mobile High-Definition Link (MHL) protocol or a High-Definition Multimedia Interface (HDMI) protocol. The medium may include a wireless communication medium.

Embodiments also relate to a source device. The source device may include a transceiver, a storage module, a cache scheme module and an encoder. The transceiver interfaces with a sink device via a communication medium. The storage modules may store capabilities information of at least one sink device. The cache scheme module receives identification information of the sink device coupled with the transceiver via the communication medium. In addition, the cache scheme module may search for capabilities information associated with the identification information in the storage module. The encoder encodes content for transmission to the sink device via the communication medium in a format compliant with capabilities of the sink device according to the capabilities information.

In one embodiment, the cache scheme module retrieves the capabilities information from the storage module after determining that the capabilities information of the sink device is stored in the storage module. In addition, the cache scheme module may receive the capabilities information from the sink device after determining that the capabilities information is not stored in the source device. The cache scheme module may also store the capabilities information in the source device. The cache scheme module may determine a replaceable entry to be overwritten with the capabilities information of the sink device after determining that memory space entries in the source device to store capabilities information are full. The cache scheme module may store the capabilities information of the sink device in the replaceable entry after determining the replaceable entry.

Embodiments also relate to a non-transitory computer readable medium configured to store program code. The program code includes instructions when executed by a processor may cause the processor to receive identification information of a sink device via a medium. The program code also may cause the processor to search for capabilities information associated with the identification information in a source device. In addition, the program code may cause the processor to encode content for transmission to the sink device via the medium in a format compliant with capabilities of the sink device according to the capabilities information. The program code may cause the processor to retrieve the capabilities information of the sink device stored in the source device after identifying the capabilities information stored in the source device.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments relate to obviating the process of receiving capabilities information of a sink device at a source device by storing and retrieving the capabilities information of the sink device received at the source device in a prior handshaking operation. The source device receives, from the sink device, identification information identifying the sink device. In response to receiving the identification information, the source device searches for and retrieves the capabilities information stored in the source device, if available, and omits the process of receiving the capabilities information from the sink device. Capabilities information for more than one sink device may be stored at the source device to expedite the handshaking operation.

A source device described herein refers to a device from which data originated. The source device may be a cell phone, a television, a laptop, a tablet, etc.

A sink device herein refers to a device receiving the data from the source device. For example, the sink device receives multimedia data streams from the source device for reproduction. The sink device may be a monitor, a projector or a TV. The multimedia data streams herein refer to image data streams, audio data streams or a combination thereof.

Identification information described herein refers to a unique identifier for the sink device. The identification information may be derived from Extended Display Identification Data, and may include vendor and product identification of the sink device. For example, in a Mobile High-Definition Link (MHL) protocol or a High-Definition Multimedia Interface (HDMI) protocol, the identification information may also be obtained from device capability registers including "ADOPTER_ID," or "DEVICE_ID."

Capabilities information described herein refers to operational settings supported by the sink device. The capabilities information of the sink device may include, but is not limited to, basic display parameters (e.g., video input definition, screen size, and gamma), color characteristics (chromaticity and white point), and timing descriptors. In addition, the capabilities information may include 3D video mode support data, high-end video support data, audio data tunneling support data, and enhanced MHL Sideband Channel (eMSC) data tunneling support data.

Example Data Communication Architecture

Figure 1:
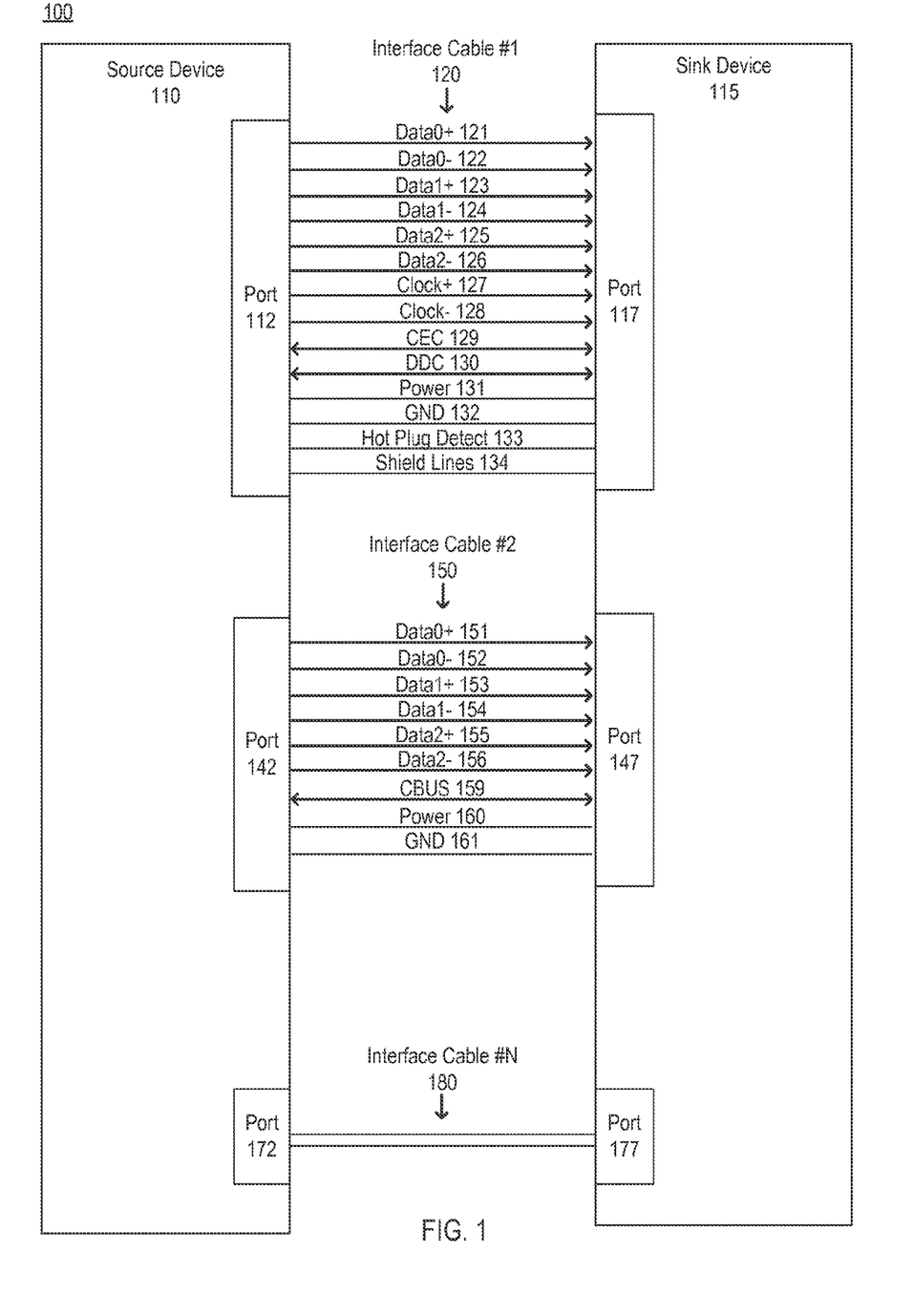
FIG. 1 is a high-level block diagram of a system for data communications, according to one embodiment.

FIG. 1 is a high-level block diagram of a system 100 for data communications, according to one embodiment. The system 100 includes a source device 110 communicating with a sink device 115 through one or more communication media (e.g., one or more interface cables 120, 150, 180).

Source device 110 transmits multimedia data streams (e.g., audio/video streams) to the sink device 115 and also exchanges control data with the sink device 115 through the interface cables 120, 150, 180. In one embodiment, source device 110 and/or sink device 115 may be repeater devices.

Source device 110 includes physical communication ports 112, 142, 172 for coupling to the interface cables 120, 150, 180. Sink device 115 also includes physical communication ports 117, 147, 177 for coupling to the interface cables 120, 150, 180. Signals exchanged between the source device 110 and the sink device 115 across the interface cables pass through the physical communication ports.

Source device 110 and sink device 115 exchange data using various protocols. In one embodiment, interface cable 150 represents a Mobile High-Definition Link (MHL) cable. The MHL cable 150 supports differential signals transmitted via data0+ line 151, data0− line 152, data1+ line 153, data1− line 154, data2+ line 155 and data2− line 156. In some embodiments of MHL, there may only be a single pair of differential data lines (e.g., 151 and 152). Embedded common mode clocks are transmitted through the differential data lines. The MHL cable 150 may further include a control bus (CBUS) 159, power 160 and ground 161. The CBUS 159 carries control information such as discovery data, configuration data and remote control commands.

In one embodiment, interface cable 120 represents a High Definition Multimedia Interface (HDMI) cable. The HDMI cable 120 supports differential signals transmitted via data0+ line 121, data0− line 122, data1+ line 123, data1− line 124, data2+ line 125, and data2− line 126. The HDMI cable 120 may further include differential clock lines clock+ 127 and clock− 128; Consumer Electronics Control (CEC) control bus 129; Display Data Channel (DDC) bus 130; power 131, ground 132; hot plug detect 133; and four shield lines 134 for the differential signals. In some embodiments, the sink device 115 may utilize the CEC control bus 129 for the transmission of closed loop feedback control data to source device 110.

The system 100 operates in two modes: a handshaking mode and a contents transfer mode. In the handshaking mode, the source device 110 loads identification information and capabilities information of the sink device 115. In the contents transfer mode, the source device 110 prepares and transmits content to the sink device 115 according to the identification information and the capabilities information.

In the handshaking mode, the system 100 performs the handshaking operation to establish proper communication between the source device 110 and the sink device 115. In the handshaking operation, the source device 110 confirms the identification information as well as the capabilities information of the sink device.

In the handshaking operation, transmitting and receiving of certain capabilities information may cause delays noticeable to users. For example, the capabilities information may include 3D video mode support data that are in relatively large size. The 3D video mode support data include mapping between 3D Video Descriptor (3D VDI) and the identification information. When communicating over the MHL protocol, for example, the sink device 115 transmits the 3D video mode support data to the source device 110 over more than one write burst sequence, because a single write burst may carry only a limited size of data. In embodiments described herein, the source device 110 utilizes the identification information and the capabilities information of the sink device 115 stored in the source device 110 to reduce delay in the handshaking operation.

Alternatively to or in addition to 3D video mode support data, the capabilities information may include one or more of high-end video support data, audio data tunneling support, and eMSC data tunneling support data. The high-end video support data include configuration settings to enable communication in high bandwidth between the source device 110 and the sink d vice 115. For example, the high-end video support data may include an index code and timing information for receiving and transmitting data in high bandwidth. The audio data tunneling support data include configuration settings to support audio data tunneling between the source device 110 and the sink device 115. With the audio data tunneling, the source device 110 packetizes the audio data and sends the packetized audio data to the sink device 115 through a control bus (CBUS). For example, the audio data tunneling support data may include timing information and packet formatting. The eMSC data tunneling support data include configuration settings to support eMSC data tunneling between the source device 110 and the sink device 115. With the eMSC data tunneling, the source device 110 and the sink device 115 communicate via a high-throughput CBUS carrying new packets defined for MHL-specific communication. For example, the eMSC data tunneling support data may include burst ID values supported by the sink device 115 and the source device 110. Transmission of high-end video support data, audio data tunneling support, and eMSC data tunneling support data may also cause delays noticeable to the users.

In the contents transfer mode, the system 100 enables the source device 110 to transfer contents to the sink device 115. The source device 110 transmits contents according to the identification information and the capabilities information of the sink device 115 obtained from the handshaking mode. The contents may include multimedia data streams according to an MHL or HDMI protocol.

Figure 2:
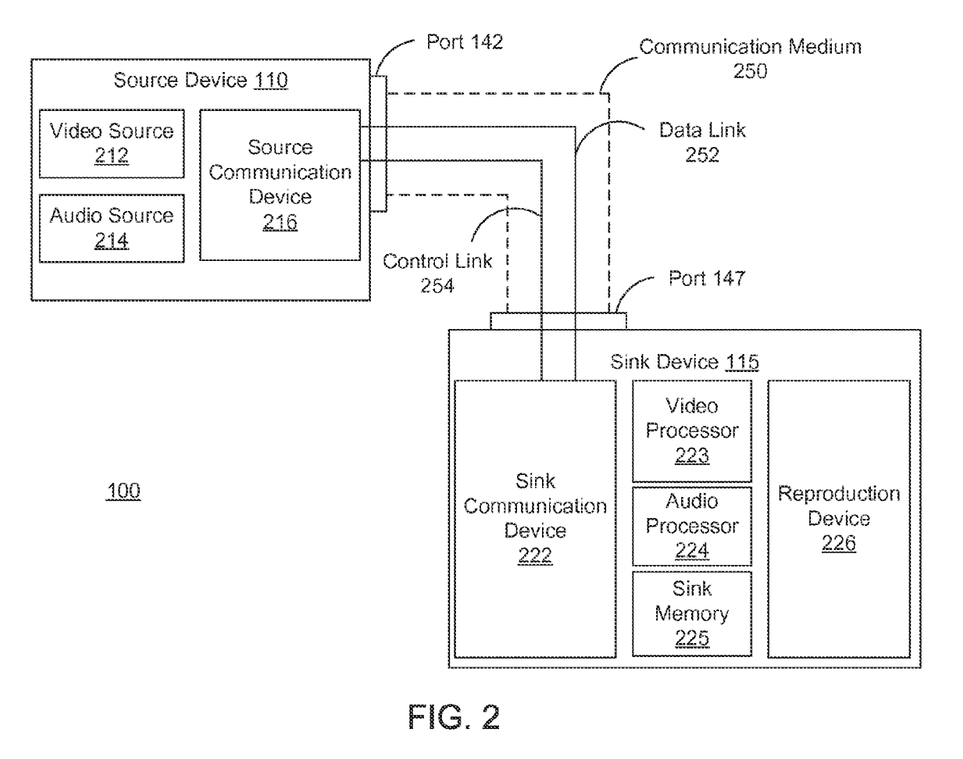
FIG. 2 is a block diagram illustrating a connection of a source device and a sink device of FIG. 1, according to one embodiment.

FIG. 2 is a detailed block diagram of the system 100 of FIG. 1, according to one embodiment. As illustrated, a communication medium 250 connects the source device 110 and the sink device 115. The communication medium 250 may include at least any one of interface cables 120, 150, and 180 of FIG. 1. Alternatively, the communication medium 250 may include a wireless communication medium.

In one embodiment, the communication medium 250 may include a data link 252 and a control link 254. The data link 252 is used to transfer data, and the control link 254 is used to exchange control signals. The communication medium 250 may be the MHL cable 150 of FIG. 1. For the MHL cable 150, the data link 252 may be formed with at least one of the differential signals transmitted via data0+ line 151, data0− 152, data1+ line 153, data1− line 154, data2+ line 155, and data2− line 156. In addition, the control link 254 may be formed with the CMS 159, The communication medium 250 is coupled to the source device 110 and the sink device 115 through the ports 142 and 147 respectively.

Alternatively, the communication medium 250 may be wireless communication medium. For the wireless communication medium, the data link 252 and the control link 254 may communicate at different frequencies and/or time frame. Alternatively, the data link 252 and the control link 254 may communicate with different coding scheme through a shared frequency and/or time frame. Additionally, the ports 142 and 147 may be coupled with antennas (not shown) for receiving and transmitting data through the wireless communication medium.

In one embodiment, the source device 110 may include, among other components, a source communication device 216, a video source 212, and an audio source 214. Each of these components may be embodied as hardware, software, firmware or a combination thereof. Together these components generate the multimedia data streams suitable to reproduce at the sink device 115.

The source communication device 216 establishes communication with the sink device 115 through the communication medium 250. In the handshaking mode, the source communication device 216 performs the handshaking operation and communicates with the sink device 115, as described below in lentil with respect to FIG. 3. In the contents transfer mode, the source communication device 216 may combine two or more streams of data (e.g. a video data stream and an audio data stream) into a single data stream. The source communication device 216 transmits the encoded signal to the sink device 115.

The video source 212 generates image data streams to be displayed at the sink device 115, according to the capabilities information of the sink device 115 in the contents transfer mode. The video source 212 may produce the image data streams with proper frequency, resolution, chromaticity and etc., to comply with the capabilities of the sink device 115. For example, the video source 212 may generate a MHL/HDMI standard 1080p resolution signal, a higher resolution signal such as a 2160p or 4K signal, or a lower resolution signal such as a 480i signal based on the resolution supported by the sink device 115. The video source 212 transfers the image data streams to the source communication device 216 for transmission to the sink device 115 in the contents transfer mode.

The audio source 214 generates audio data streams to be reproduced at the sink device 115, according to the capabilities information of the sink device 115 in the contents transfer mode. The audio source 214 may produce the audio data streams with proper frequency, sample sizes, number of channels and etc., to comply with the capabilities of the sink device 115. For example, the audio source 214 may generate up to 8 channels of uncompressed audio data stream. The audio source 214 transfers the audio data streams to the source communication device 216 for transmission to the sink device 115 in the contents transfer mode.

In one embodiment, the sink device 115 may include, among other components, a sink communication device 222, a video processor 223, an audio processor 224, a sink memory and a reproduction device 226. Each of these components may be embodied as hardware, software, firmware or a combination thereof. Together, these components render image and/or audio representations to a user according to the contents transmitted from the source device 110.

The sink communication device 222 establishes communication with the source device 110 through the communication medium 250. In the handshaking mode, the sink communication device 222 transmits the identification information of the sink device 115 to the source device 110 for the handshaking operation. The sink communication device 222 may also transmit the capabilities information of the sink device 115 to the source device 110, if the source device 110 requests. In the contents transfer mode, the sink communication device 222 receives the image and audio data streams from the source communication device 216. In addition, the sink communication device 222 decodes and decomposes the combined age and audio data streams.

The sink memory 225 may store the identification information as well as the capabilities information of the sink device 115. The sink memory 225 may be a volatile memory, non-volatile memory, or a combination thereof. During the handshaking operation, the sink device 115 may read data stored in the sink memory 225 for transmission to the source device 110.

The video processor 223 is hardware, firmware, software or a combination thereof for processing video images for displaying on the reproduction device 226. The video processor 223 receives the image data streams from the sink communication device 222 in the contents transfer mode. The audio processor 224 is hardware, firmware, software or a combination thereof for processing audio data for playing on the reproduction device 226. The audio processor 224 receives the audio data streams from the sink communication device 222 in the contents transfer mode.

The reproduction device 226 produces image and/or audio representations to the user. The reproduction device 226 may include, for example, a display device and a speaker. Although the reproduction device 226 is illustrated as being included in the sink device 115 in FIG. 2, in other embodiments, the reproduction device 226 may be provided as a device separate from the sink device 115.

Figure 3:
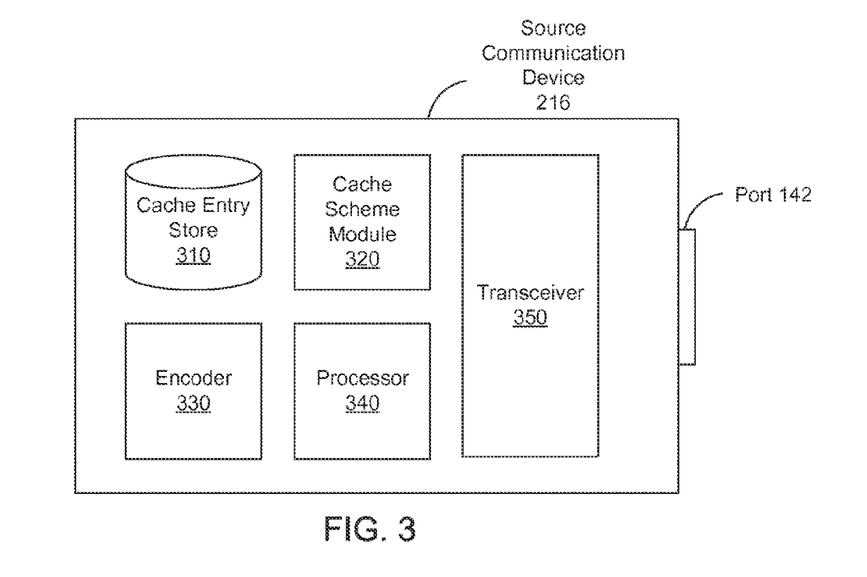
FIG. 3 is a block diagram of the source communication device of FIG. 2, according to one embodiment.

Referring to FIG. 3, illustrated is one embodiment of the source communication device 216. The source communication device 216 includes a processor 340 that is communicatively coupled to a cache entry store 310, a cache scheme module 320, an encoder 330, and a transceiver 350. Each of these components may be embodied as hardware, software, firmware or a combination thereof. Together, these components perform the handshaking operation as well as the contents transfer.

The cache entry store 310 is a repository including memory space entries to retain identification information and capabilities information of sink devices 115. In one embodiment, each memory space entry in the cache oz by store 310 contains identification information of a sink device 115, capabilities information of the sink device 115, and a hit count. The hit count is used to keep track of a number of times a sink device 115 is connected to the source device 110. Additionally, each memory space entry may also record recent connection time and duration of the last connection. In the handshaking operation, data stored n the cache entry store 310 may be utilized by the processor 340 for performing the handshaking operation.

The processor 340 receives instructions from the cache scheme module 320. Accordingly, the processor 340 operates the cache entry store 310, encoder 330 and transceiver 350 according to the instructions from the cache scheme module 320 to perform the handshaking operation. The processor 340 may combine the image data streams and the audio data streams for transmission over the data link 252 in the contents transfer mode.

The cache scheme module 320 contains instructions to operate the processor 340 for performing the handshaking operation. Specifically, the cache scheme module 320 may contain instructions to obtain identification information and capabilities information of the sink device 115. The cache scheme module 320 is implemented as one or more non-transitory computer readable storage media (e.g., hard disk drive, solid state memory, and etc.), and stores software instructions that are executed by the processor 340. Operating system software and other application software may also be stored in the cache scheme module 320 to be executed by the processor 340.

One example instruction in the cache scheme module 320 may search for the capabilities information of the sink device 115 in the cache entry store 310. If the capabilities information is already stored in the cache entry store 310 (i.e., a "cache hit" is made), the cache scheme module 320 may contain instructions for the processor 340 to retrieve the capabilities information from the cache entry store 310. When retrieving the capabilities information from the cache entry store 310, the instructions in the cache scheme module 320 may cause the processor 340 to increase the hit count associated with the sink device 115.

On the other hand, if the capabilities information is not stored in the cache entry store 310 (i.e., a "cache miss" occurred), the cache scheme module 320 may contain instructions for the processor 340 to obtain the capabilities information from the sink device 115 through the transceiver 350. The cache scheme module 320 may identify an available entry in the cache entry store 310 to store the capabilities information for future usage.

In determining the available entry, the instructions in the cache scheme module 320 may cause the processor 340 to determine whether a non-used entry is available. If a non-used entry in the source device 110 to store the capabilities information, the instructions in the cache scheme module 320 may cause the processor 340 to store the capabilities information in the non-used entry as the available entry.

In case memory space entries in the cache entry store 310 to store capabilities information are full, the instructions in the cache scheme module 320 may cause the processor 340 to determine a replaceable entry to be overwritten with the capabilities information of the sink device 115. If the replaceable entry exists, the instructions in the cache scheme module 320 may cause the processor 340 to store the capabilities information of the sink device 115 in the replaceable entry.

The replaceable entry may be determined based on a hit count, or a connection history of the identification information of the sink device 115. For example, a replaceable sink device 115 may have a hit count less than a predetermined value (e.g., '1'). If multiple memory space entries have hit counts less than the predetermined value, an entry with the shortest connection time or an oldest connection history may be determined to be the replaceable entry.

The cache scheme module 320 may include instructions to allow capabilities information of a newly connected sink device 115 to be given an opportunity to be registered in the cache entry store 310 in case all memory space entries are used. In one embodiment, the instructions in the cache scheme module 320 may adjust all hit counts in the cache entry store 310.

In one embodiment, all hit counts stored in the cache entry store 310 may be reduced, when one of the hit counts in the cache entry store 310 reaches a threshold value (e.g., '10'). For example, all hit counts in the cache entry store 310 may be divided by two or any number. Therefore, in case one sink device 115 is heavily used compared to a least connected sink device 115, the hit count associated with the least connected sink device 115 eventually becomes less than the predetermined value. The instructions in the cache scheme module 320 may allow capabilities information of a newly connected sink device 115 to replace the capabilities information of another sink device 115 associated with a hit count less than the predetermined value. Further, the instructions in the cache scheme module 320 may store the hit count of the newly connected sink device 115 as an initial value (e.g., '1') in the cache entry store 310.

If all sink devices 115 associated with the memory space entries are substantially evenly used, hit counts for all memory space entries remain higher than the predetermined value. In such a case, the capabilities information of the new device sink device 115 will not replace any capabilities information stored in the memory space entries.

The transceiver 350 may include a transmitter (not shown) and a receiver (not shown) that are coupled to the port 142 for reception or transmission of the multimedia data streams and control data. The multimedia data streams that are received or transmitted may include video data streams and/or audio data streams, such as HDMI and MHL data. The multimedia data streams may be encrypted for transmission using an encryption scheme such as HDCP (High-Bandwidth Digital-Content Protection).

The encoder 330 encodes the multimedia data streams for transmission to the sink device 115 via the communication medium 250 in a format compliant with capabilities of the sink device 115 according to the capabilities information. Depending on the capabilities of the sink device 115, encoding may be omitted.

Embodiments have many advantages including, but not limited to, achieving speed improvement in the handshaking operation by reducing delay in exchanging capabilities information.

Method of Implementing Improved Handshaking

Figure 4:
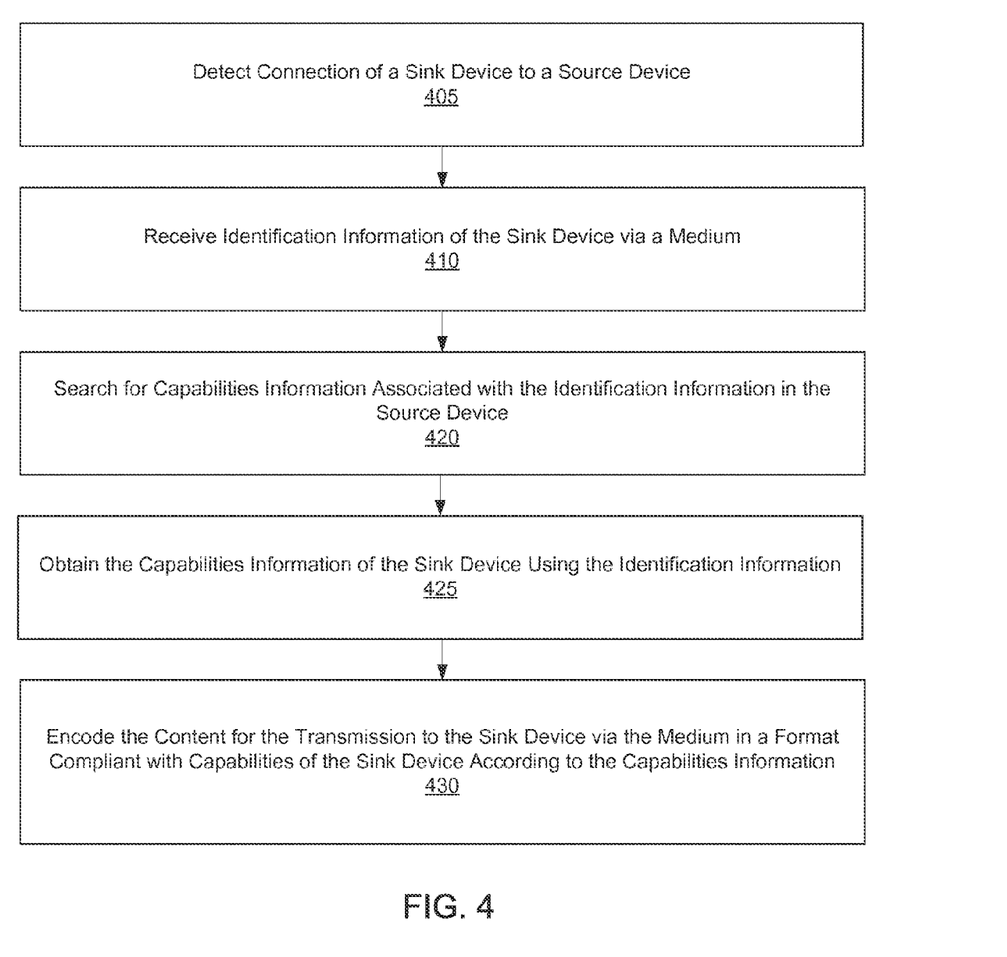
FIG. 4 is a flow diagram illustrating a process of performing a handshaking operation, according to one embodiment.

Referring to FIG. 4, illustrated is a flow diagram illustrating a process of performing a handshaking operation in the system 100 described above with respect to FIGS. 1 through 3, according to one embodiment. The source device 110 detects 405 a connection of a sink device 115. Detecting 405 the connection may be performed by detecting voltage, current, or a sequence of pulses supplied from one device to another via the communication medium 250.

The source device 110 receives 410 identification information of the sink device 115 via the communication medium 250. If the connection is established between the source device 110 and the sink device 115, the sink device 115 may transmit the identification information of the sink device 115 to the source device 110, as described above in detail with respect to FIG. 2.

The source device 110 searches 420 for capabilities information associated with the identification information of the sink device 115 in the source device 110. Specifically, the source device 110 determines whether the capabilities information of the sink device 115 exists in the cache entry store 310 of FIG. 3 or not.

Based on the result of search 420, the source device 110 obtains 425 the capabilities information of the sink device 115 associated with the sink device 115 using the identification information. The source device 110 may receive the capabilities information from the sink device 115 or retrieve it from the cache entry store 310 illustrated in FIG. 3.

Additionally, the source device 110 may encode 430 multimedia data streams for the transmission to the sink device 115 via the communication medium 250 in a format compliant with capabilities of the sink device 115 according to the capabilities information.

Figure 5:
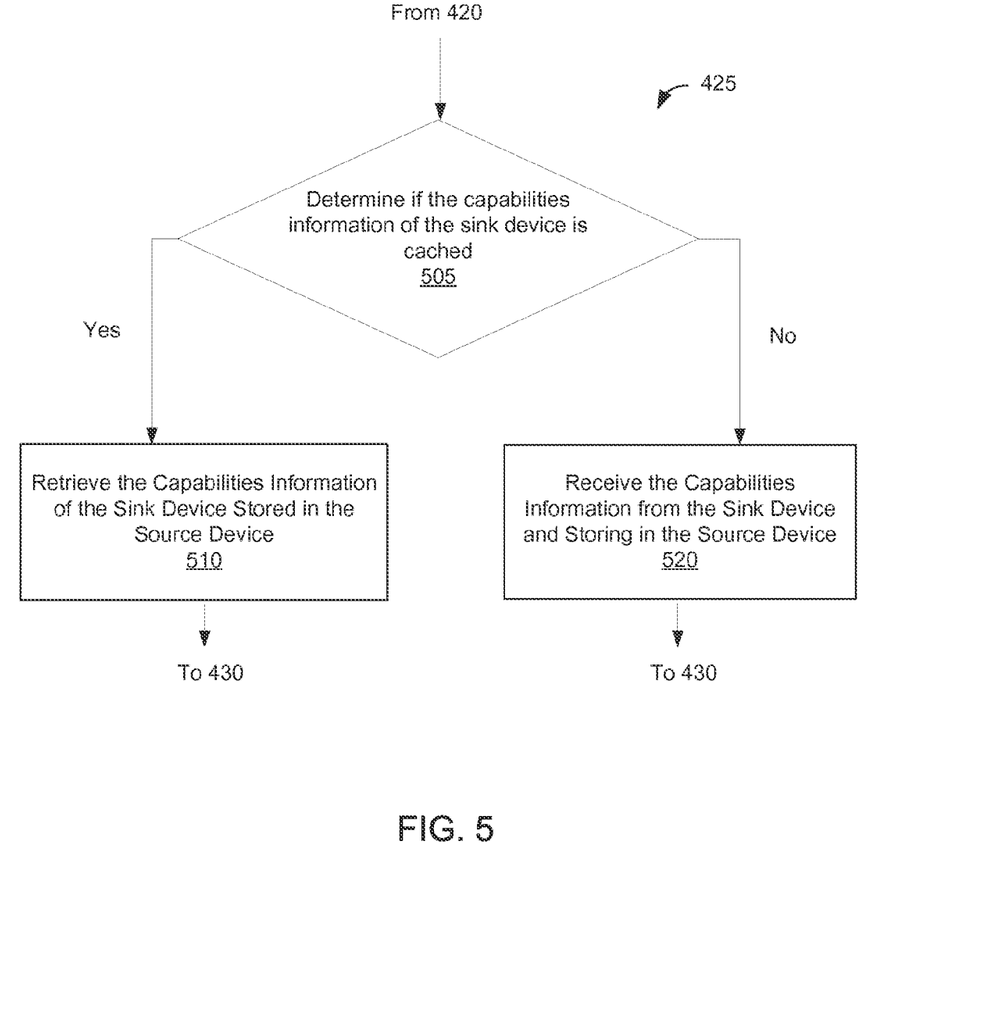
FIG. 5 is a flow diagram illustrating a detailed process of obtaining capabilities information of the sink device of FIG. 4, according to one embodiment.

FIG. 5 is a flow chart illustrating a detailed process of obtaining 425 the capabilities information of the sink device 115 of FIG. 4, according to one embodiment. Based on the result of search 420, the source device 110 determines 505, if the capabilities information of the sink device 115 is cached (i.e., stored) in the source device 110 (i.e., a "cache hit" is made) or not (i.e., a "cache miss" occurred).

If the capabilities information of the sink device 115 is stored in the cache entry store 310 of the source device 110, the source device 110 retrieves 510 the capabilities information of the sink device 115 stored in a memory space entry of the source device 110.

If the capabilities information of the sink device 115 is not found in the cache entry store 310 of the source device 110, the source device 110 receives 520, from the sink device 115, the capabilities information of the sink device 115. The source device 110 may store the capabilities information in an available entry of the source device 110. The available entry may be a non-used entry or a replaceable entry from memory space entries, as described above in detail with respect to FIG. 3.

Figure 6:
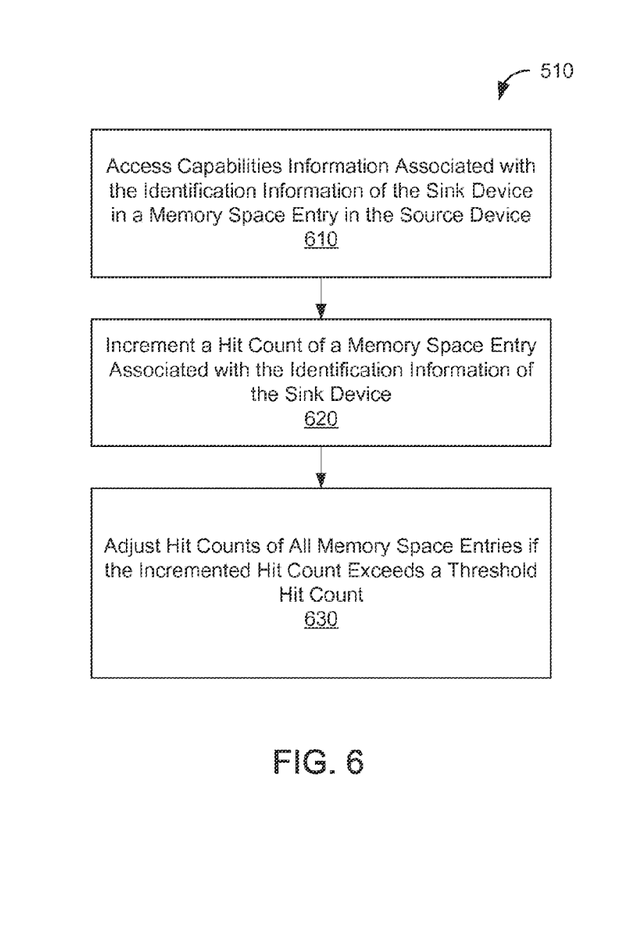
FIG. 6 is a flow diagram illustrating a process of retrieving the capabilities information of the sink device stored in the source device of FIG. 5, according to one embodiment.

FIG. 6 is a detailed process of retrieving 510 the capabilities information of the sink device 115 stored in the source device 110 of FIG. 5, according to one embodiment. The source device 110 accesses 610 the capabilities information associated with the identification information of the sink device 115 from a memory space entry in the source device 110.

In response to identifying the capabilities information in the cache entry store 310 of the source device 110 of FIG. 3, the source device 110 may increment 620 a hit count associated with the identification information of the sink device 115. The hit count may be stored in the cache entry store 310 as described above in detail with respect to FIG. 3.

The source device 110 may adjust 630 hit counts of all memory space entries, in an event that one of the hit counts reaches a threshold value. For example, the hit counts for all memory space entries may be reduced by half as described above in detail with respect to FIG. 3.

Figure 7:
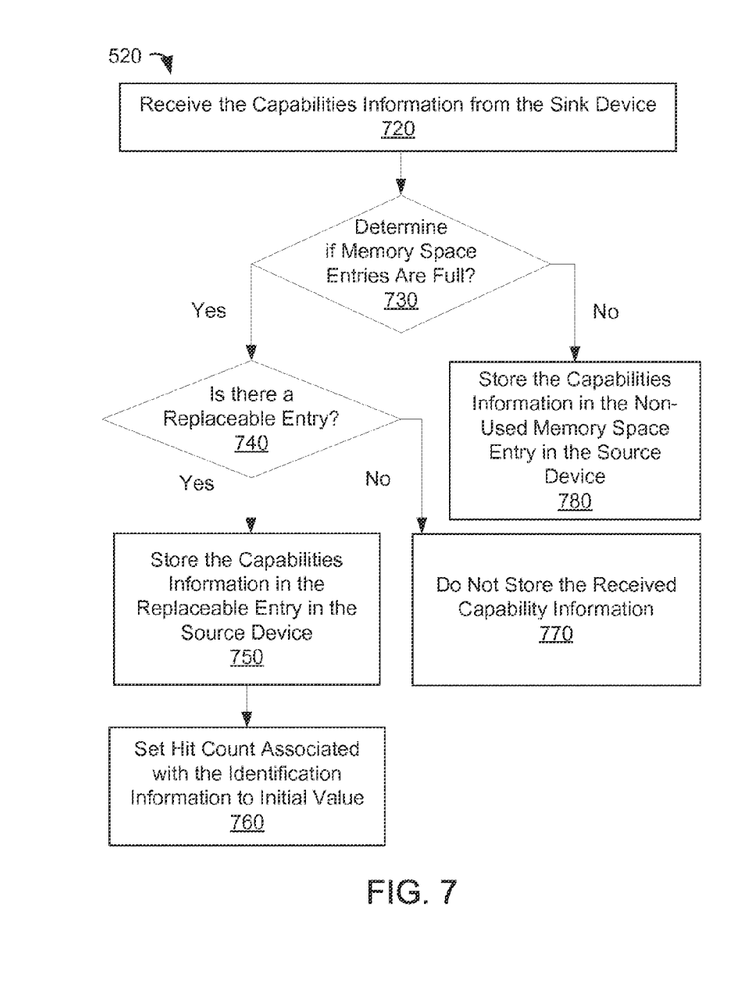
FIG. 7 is a detailed process of receiving the capabilities information from the sink device and storing in the source device of FIG. 5, according to one embodiment.

FIG. 7 is a detailed process of receiving 520 the capabilities information from the sink device 115 and storing in the source device 110 of FIG. 5, according to one embodiment. The source device 110 receives 720 the capabilities information from the sink device 115.

In order to determine an available entry to store the capabilities information of the sink device 115, the source device 110 determines 730 whether memory space entries are full.

If a non-used entry exists from the memory space entries, the source device stores 780 the capabilities information in the non-used memory space entry in the source device 110.

If the memory space entries are full, the source device 110 determines 740 if there is a replaceable entry available. In one embodiment, a hit count associated with the replaceable entry is lower than a predetermined value. If there are multiple memory space entries with hit counts lower than the predetermined value, a memory space entry with the oldest connection time may be the replaceable entry. Alternatively, a memory space entry with the shortest connection time may be the replaceable entry.

When it is determined 740 that the replaceable entry is available, the source device 110 stores 750 the capabilities information in the replaceable entry in the source device 110.

Furthermore, the source device 110 sets 760 a hit count associated with the identification information of the sink device 115 to an initial value. In one embodiment, the initial value may be the predetermined value, but can be determined to be any value. By setting the initial value higher than the predetermined value, information of a newly connected device stored may be retained longer in the cache entry store 310 compared to setting the initial value equal to the predetermined value.

In case the source device 110 determines that no replaceable entry exists, the capabilities information received 720 may be still used to establish connection between the source device 110 and the sink device 115 in the data transfer mode. However, the source device 110 may not store 770 the received capabilities information in the cache entry store 310 for the future usage.

Embodiments have advantages including, but not limited to, (i) eschewing slow communication involved in transferring the capabilities information, thereby (ii) expediting the handshaking operation by utilizing the pre-stored capabilities information in the handshaking operation.

Embodiments are described herein primarily with reference to MHL protocol. However, other protocols such as HDMI or other protocols involving a handshaking operation may take advantage of the same principles described herein.

Upon reading this disclosure, those of skill in the art will appreciate still additional alternative designs for an improved handshaking between two devices. Thus, while particular embodiments and applications of the present disclosure have been illustrated and described, it is to be understood that the embodiments are not limited to the precise construction and components disclosed herein and that various modifications, changes and variations which may be made in the arrangement, operation and details of the method and apparatus of the present disclosure disclosed herein without departing from the spirit and scope of the disclosure as defined in the appended claims.

What is claimed is:

1. A method of encoding content by a source device, the method comprising:
   receiving identification information of a sink device via a medium;
   searching for capabilities information associated with the identification information in the source device;
   responsive to determining that the capabilities information is not stored in the source device, receiving the capabilities information from the sink device;
   storing the capabilities information in the source device, storing the capabilities information comprising:
      responsive to determining that memory space entries in the source device configured to store the capabilities information are full, determining a replaceable entry to be overwritten with the capabilities information of the sink device, and
      responsive to determining the replaceable entry, storing the capabilities information of the sink device in the replaceable entry; and
   encoding the content for transmission to the sink device via the medium in a format compliant with capabilities of the sink device according to the capabilities information.

2. The method of claim 1, wherein the identification information of the sink device is derived from Extended Display Identification Data (EDID) of the sink device.

3. The method of claim 1, wherein the capabilities information comprises 3D video support data, or enhanced MHL Sideband Channel data tunneling support data of the sink device.

4. The method of claim 1, further comprising, responsive to identifying the capabilities information stored in the source device, retrieving the capabilities information of the sink device stored in the source device.

5. The method of claim 1, wherein the medium comprises a cable compatible for transmitting data using a Mobile High-Definition Link (MHL) protocol or a High-Definition Multimedia Interface (HDMI) protocol.

6. The method of claim 5, wherein the capabilities information comprises video support data of the sink device transmitted to the source device over one or more write burst sequences.

7. The method of claim 1, wherein the medium comprises a wireless communication medium.

8. The method of claim 1, wherein determining the replaceable entry comprises:
   identifying entries from the memory space entries, each of the identified entries associated with a corresponding hit count below a predetermined value, a hit count associated with an entry indicative of a number of times a sink device associated with the entry connected to the source device.

9. The method of claim 8, wherein determining the replaceable entry comprises:
   determining the replaceable entry from the identified entries, the replaceable entry associated with an infrequent sink device having a shortest connection time with the source device among sink devices associated with the identified entries.

10. The method of claim 8, wherein determining the replaceable entry comprises:
    determining the replaceable entry from the identified entries, the replaceable entry associated with an infrequent sink device having an oldest connection history with the source device among sink devices associated with the identified entries.

11. The method of claim 1, wherein the replaceable entry from the memory space entries is associated with an infrequent sink device having a fewer number of times being connected to the sink device than other sink devices associated with other entries of the memory space entries.

12. A source device comprising:
    a transceiver configured to interface with a sink device via a communication medium;
    a storage module configured to store capabilities information of at least one sink device;
    a cache scheme module configured to:
       receive identification information of the sink device coupled with the transceiver via the communication medium, and
       search for capabilities information associated with the identification information in the storage module,
       responsive to determining that the capabilities information is not stored in the source device, receive the capabilities information from the sink device,
       store the capabilities information in the source device, storing the capabilities information comprising:
          responsive to determining that memory space entries in the source device configured to store the capabilities information are full, determining a replaceable entry to be overwritten with the capabilities information of the sink device, and
          responsive to determining the replaceable entry, storing the capabilities information of the sink device in the replaceable entry; and
    an encoder configured to encode content for transmission to the sink device via the communication medium in a format compliant with capabilities of the sink device according to the capabilities information.

13. The source device of claim 12, wherein the identification information of the sink device is derived from Extended Display Identification Data (EDID) of the sink device.

14. The source device of claim 12, wherein the capabilities information comprises one or more of 3D video support data, high-end video support data, audio data tunneling support data, and enhanced MHL Sideband Channel data tunneling support data of the sink device.

15. The source device of claim 12, wherein the cache scheme module is configured to retrieve the capabilities information from the storage module responsive to determining that the capabilities information of the sink device is stored in the storage module.

16. The source device of claim 12, wherein the communication medium comprises a cable compatible for transmitting data using a Mobile High-Definition Link (MHL) protocol or a High-Definition Multimedia Interface (HDMI) protocol.

17. The source device of claim 16, wherein the capabilities information comprises video support data of the sink device transmitted to the source device over one or more write burst sequences.

18. The source device of claim 12, wherein the communication medium comprises a wireless communication medium.

19. A non-transitory computer readable medium configured to store program code, the program code comprising instructions when executed by a processor cause the processor to:
receive identification information of a sink device via a medium;
search for capabilities information associated with the identification information in a source device;
responsive to determining that the capabilities information is not stored in the source device, receive the capabilities information from the sink device;
store the capabilities information in the source device, storing the capabilities information comprising:
responsive to determining that memory space entries in the source device configured to store the capabilities information are full, determining a replaceable entry to be overwritten with the capabilities information of the sink device, and
responsive to determining the replaceable entry, storing the capabilities information of the sink device in the replaceable entry; and
encode content for transmission to the sink device via the medium in a format compliant with capabilities of the sink device according to the capabilities information.

20. The non-transitory computer readable medium of claim 19, wherein the program code further comprises instructions that cause the processor to:
responsive to identifying the capabilities information stored in the source device, retrieve the capabilities information of the sink device stored in the source device.

* * * * *